United States Patent
Koo et al.

(10) Patent No.: US 7,587,120 B2
(45) Date of Patent: Sep. 8, 2009

(54) VOLUMETRIC THREE-DIMENSIONAL (3D) DISPLAY SYSTEM USING TRANSPARENT FLEXIBLE DISPLAY PANELS

(75) Inventors: Jae-phil Koo, Seoul (KR); Dae-sik Kim, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 118 days.

(21) Appl. No.: 11/418,122

(22) Filed: May 5, 2006

(65) Prior Publication Data

US 2007/0009222 A1    Jan. 11, 2007

(30) Foreign Application Priority Data

Jul. 7, 2005 (KR) .................... 10-2005-0061185

(51) Int. Cl.
*G02B 6/00* (2006.01)
(52) U.S. Cl. ........................ 385/147; 385/146
(58) Field of Classification Search ............. None
See application file for complete search history.

(56) References Cited

U.S. PATENT DOCUMENTS

| | | | | |
|---|---|---|---|---|
| 4,371,345 A * | 2/1983 | Palmer et al. | ........... | 434/368 |
| 5,113,272 A * | 5/1992 | Reamey | ........... | 349/78 |
| 5,764,317 A * | 6/1998 | Sadovnik et al. | ........... | 349/5 |
| 6,721,023 B1 * | 4/2004 | Weiss et al. | ........... | 349/87 |
| 6,898,302 B1 * | 5/2005 | Brummer | ........... | 382/131 |
| 2004/0150584 A1 * | 8/2004 | Chuman et al. | ........... | 345/6 |
| 2004/0160535 A1 * | 8/2004 | Chuman et al. | ........... | 348/739 |

* cited by examiner

*Primary Examiner*—Sung H Pak
(74) *Attorney, Agent, or Firm*—Sughrue Mion, PLLC

(57) ABSTRACT

Provided are a volumetric three-dimensional display panel formed by stacking a plurality of transparent, flexible two-dimensional display panels, such as organic light-emitting devices, to have a curved surface, and a volumetric three-dimensional display system employing the volumetric three-dimensional display panel. In the volumetric three-dimensional display panel, two-dimensional images are displayed on the two-dimensional flexible display panels to form a single three-dimensional image, and a display surface of the volumetric three-dimensional display panel is curved with a predetermined curvature or is flat.

10 Claims, 9 Drawing Sheets

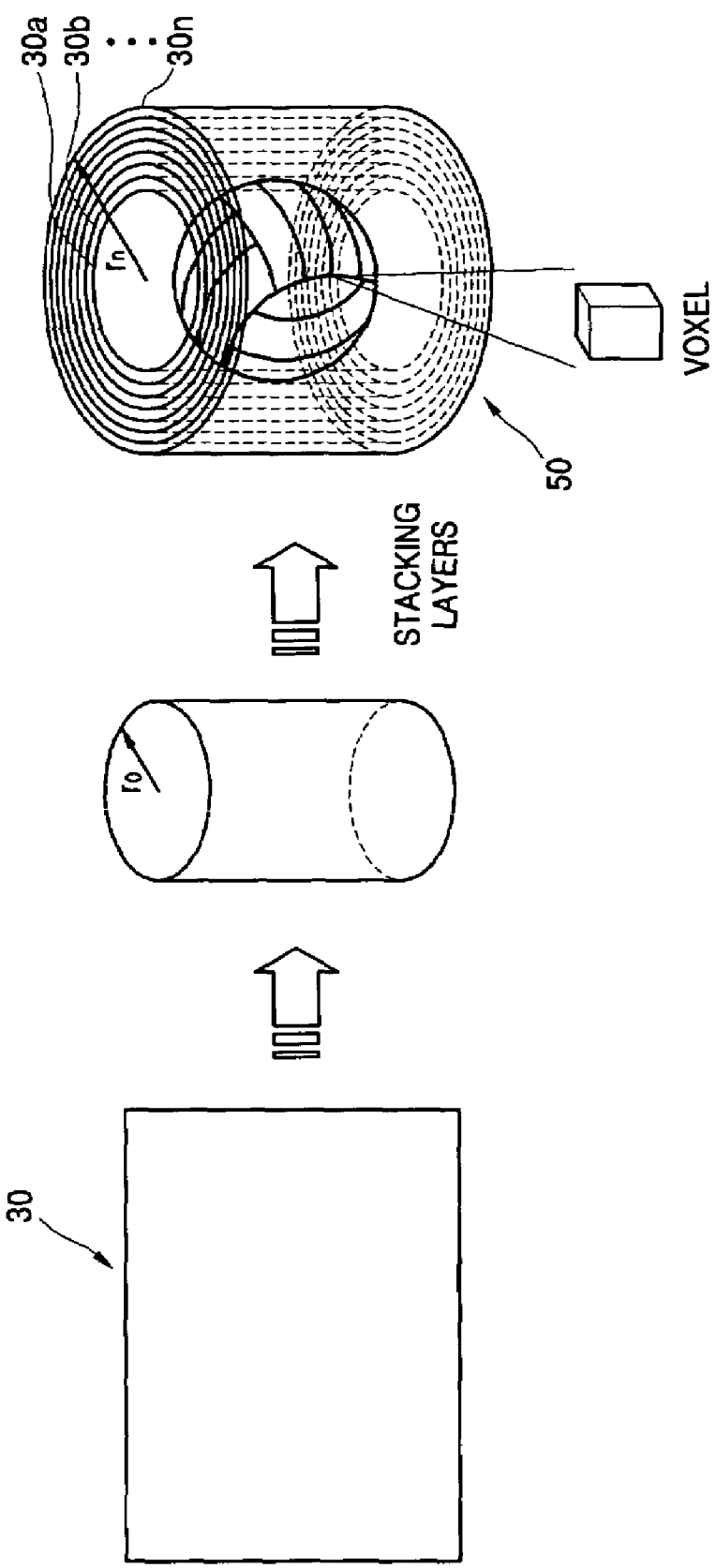

VIEWING ANGLE

VIEWING ANGLE

VOLUMETRIC THREE-DIMENSIONAL (3D) DISPLAY SYSTEM USING TRANSPARENT FLEXIBLE DISPLAY PANELS

CROSS-REFERENCE TO RELATED PATENT APPLICATIONS

This application claims the benefit of Korean Patent Application No. 10-2005-0061185, filed on Jul. 7, 2005, in the Korean Intellectual Property Office, the disclosure of which is incorporated herein in its entirety by reference.

BACKGROUND OF THE INVENTION

1. Field of the Invention

The present invention relates to a volumetric 3D display panel and a volumetric 3D display system using the volumetric 3D display panel. More particularly, the present invention relates to a volumetric 3D display panel formed by stacking a plurality of transparent, flexible display panels like organic light-emitting devices to have a curved surface and a volumetric 3D display system using the volumetric 3D display panel.

2. Description of the Related Art

A three-dimensional (3D) image is formed according to the principle of stereoscopic vision through two eyes of a human being. A binocular parallax, which is generated due to the separation of the two eyes by about 65 mm, can be considered as the most important factor of a cubic effect. In various fields, such as, medical images, games, advertising, education, military affairs, 3D image display based on the binocular parallax principle is recently in great demand. Moreover, with the gradual popularization of high-resolution TVs, popularization of 3D TVs through which viewers can view 3D images is anticipated in the future. Hence, various stereoscopic display techniques have been proposed.

General stereoscopic display techniques are roughly classified into a glasses stereoscopic display technique, a glass-less stereoscopic display technique, and a perfect stereoscopic 3D display technique.

In both a glasses stereoscopic display technique and a glass-less stereoscopic display technique, two 2-dimensional images having parallax therebetween are provided to the left eye and the right eye, respectively, of a human to provide a stereoscopic effect. However, the glasses stereoscopic display technique requires a viewer to wear a special accessory, such as, polarized glasses, to enjoy a 3D image. In the glass-less stereoscopic display technique, only a viewer positioned at a predetermined location can view a 3D image, because there is only one viewing zone or there are several separated viewing zones. Furthermore, both the glasses and glass-less stereoscopic display techniques have a limit in that only a depth of an object is reproduced, that is, viewers cannot enjoy all of images of an object as viewed in various directions.

To solve these problems, the perfect stereoscopic 3D display technique has been proposed, in which a convergence angle made by the left and right eyes viewing an image is consistent with a focal point of the two eyes so that a perfect 3D image can be recognized. Examples of the perfect stereoscopic 3D display technique include integral photography and holography. However, integral photography has a disadvantage in that a parallax range and a viewing angle obtained by a lens are restricted. Holography has disadvantages in that a coherent light source, such as, a laser, is required and that recording and reproducing a large object located at a far distance is difficult.

A volumetric 3D display technique also belongs to a perfect stereoscopic 3D display technique. FIG. 1 schematically illustrates a conventional volumetric 3D display device employing a volumetric 3D display technique. Referring to FIG. 1, the conventional volumetric 3D display device includes a projector 10 for projecting an image and a multi-plate optical panel 11 onto which the image from the projector 10 is projected. The multi-plate optical panel 11 is a stack of a plurality of optical plates 11a through 11e. Each of the optical plates 11a through 11e is, for example, a controllable, variable, semitransparent liquid crystal device. When turned off, the optical plates 11a through 11e become transparent so that the image from the projector 10 can pass through the optical plates 11a through 11e. When turned on, the optical plates 11a through 11e enter into an opaque light-scattering state so that the image from the projector 10 can pass through the optical plates 11a through 11e.

In this structure, the projector 10 produces a 3D image on the multi-plate optical panel 11 by consecutively projecting a plurality of images having different depths onto the optical plates 11a through 11e using a time-division technique. More specifically, the protector 10 sequentially projects first through fifth images Im1 through Im5 onto the optical plates 11a through 11e according to a time-division technique. Each of the optical plates 11a through 11e enters into an opaque light-scattering state when a corresponding image is projected from the projector 10. Then, the first through fifth images Im1 through Im5 are sequentially projected onto the optical plates 11a through 11e, respectively. Since the projection of the plurality of images is accomplished within a very short period of time, an observer perceives the plurality of images to be a single 3D image Im6. Hence, a visual effect where a 3D object seems to be formed within a space is obtained.

However, the projector 10 should raster at ultrahigh speed to produce a natural 3D image from a plurality of 2D images. To display a 3D image without flickering, the projector 10 should project the plurality of 2D images onto the optical plates 11a through 11e at a speed of at least 1.5 Khz to 2 Khz. Hence, the conventional volumetric 3D display device requires a projector capable of projecting an image at a speed of several thousands of Hz.

FIG. 2 schematically illustrates another conventional volumetric 3D display device. In the conventional volumetric 3D display device of FIG. 2, a projector 20 consecutively projects images onto a bent screen 22 installed within a cylindrical frame 21 and simultaneously rotates the screen 22 at high speed, thereby obtaining a 3D image. However, in the conventional volumetric 3D display device, a motor (not shown) for rotating the screen 22 may generate noise, and forming a large volumetric 3D display system using a large screen is difficult due to friction between the screen 22 and the frame 21 and air resistance. Furthermore, a volumetric 3D display system using the conventional volumetric 3D display device is prone to break due to the friction and air resistance, so that the lifespan of the system decreases.

SUMMARY OF THE INVENTION

The present invention provides a volumetric 3D display panel capable of producing a more complete 3D image in a simple scheme and with low costs, and a volumetric 3D display system using the volumetric 3D display panels.

The present invention also provides a curved volumetric 3D display panel having a viewing angle widened by using a plurality of transparent, flexible display panels.

According to an aspect of the present invention, there is provided a volumetric three-dimensional display panel comprising a plurality of transparent two-dimensional flexible display panels which are stacked, wherein two-dimensional images are displayed on the two-dimensional flexible display panels to form a single three-dimensional image, and a display surface of the volumetric three-dimensional display panel is curved with a predetermined curvature or flat.

The volumetric three-dimensional display panel may have a cylindrical shape by stacking and rolling a plurality of flat, rectangular two-dimensional flexible display panels in a circle.

The volumetric three-dimensional display panel may have a half cylindrical shape by stacking and rolling a plurality of flat, rectangular two-dimensional flexible display panels in a semicircle.

The volumetric three-dimensional display panel may have a fan-shaped cross-section by stacking and rolling a plurality of flat, rectangular two-dimensional flexible display panels fanwise.

The volumetric three-dimensional display panel may have a conical shape by stacking and rolling a plurality of flat fan-shaped two-dimensional flexible display panels.

The volumetric three-dimensional display panel may have a convex display surface.

Each of the transparent two-dimensional display panels may include a transparent substrate, a first transparent electrode formed on the transparent substrate, an organic light-emitting layer formed on the first transparent electrode, and a second transparent electrode formed on the organic light-emitting layer.

According to another aspect of the present invention, there is provided a volumetric three-dimensional display system including a volumetric three-dimensional display panel and a control unit. The volumetric three-dimensional display panel is a stack of a plurality of transparent two-dimensional flexible display panels. The control unit distributes a plurality of two-dimensional images having depth information produced from an input three-dimensional image to the transparent two-dimensional display panels according to the depth information. The two-dimensional images are displayed on the transparent two-dimensional display panels to form a single three-dimensional image, and a display surface of the volumetric three-dimensional display panel is curved with a predetermined curvature or is flat.

The control unit may include a coordinate transformation unit for transforming a coordinate of an input three-dimensional image into a coordinate of the volumetric three-dimensional display panel, and a multiplexer for dividing the coordinate-transformed 3D image into a plurality of two-dimensional images having depth information and distributing the plurality of two-dimensional images to the transparent flat display panels according to the depth information.

The control unit may further include an interaction unit for rotating, translating, or zooming in/out the input three-dimensional image according to a user's command.

BRIEF DESCRIPTION OF THE DRAWINGS

The above and other features and advantages of the present invention will become more apparent by describing in detail exemplary embodiments thereof with reference to the attached drawings in which:

FIGS. 6A through 6C illustrate a cylindrical volumetric 3D display panel according to another embodiment of the present invention;

DETAILED DESCRIPTION OF THE INVENTION

Figure 9:
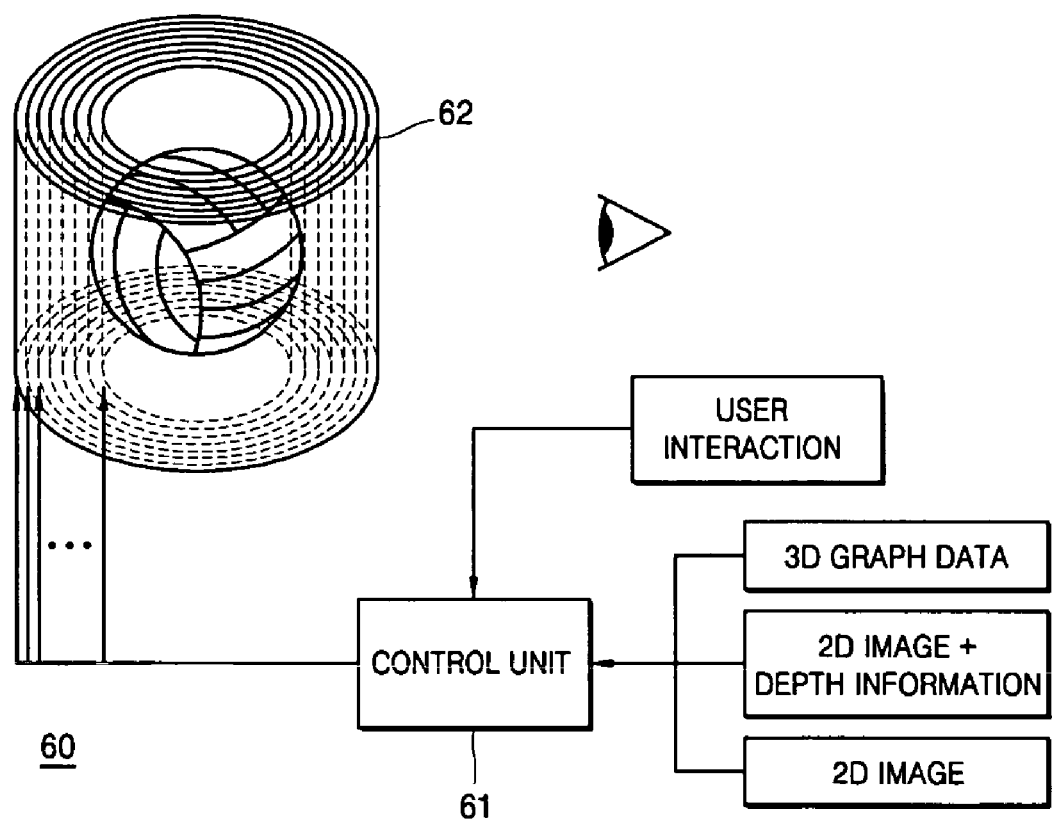
FIG. 9 schematically illustrates a volumetric 3D display system according to an exemplary embodiment of the present invention.

FIG. 9 schematically illustrates a volumetric 3D display system 60 according to an exemplary embodiment of the present invention. As shown in FIG. 9, the volumetric 3D display system 60 includes a volumetric 3D display panel 62 and a control unit 61. The volumetric 3D display panel 62 is a stack of a plurality of transparent 2-dimensional (2D) display panels. The control unit 61 distributes a plurality of 2D images produced from an input 3D image to the plurality of transparent 2D display panels according to depth information of the 2D images. As shown in FIG. 9, a display surface of the volumetric 3D display panel 62 is curved with a predetermined curvature to enlarge a viewing angle. To make the display surface of the volumetric 3D display panel 62 curved, the volumetric 3D display panel 62 is formed by stacking and rolling the plurality of thin, flexible, transparent flat display panels.

In the volumetric 3D display system 60 having this structure, each of the transparent 2D display panels, which constitute the volumetric 3D display panel 62, displays a 2D image. The 2D images displayed on the transparent flat display panels are produced by dividing a 3D image according to depth values. The control unit 61 distributes these 2D images to the corresponding transparent 2D display panels according to the depth values. Since the 2D display panels are transparent, an observer recognizes the plurality of 2D images displayed on the 2D display panels as a single complete 3D image having a depth.

In the volumetric 3D display system 60, the transparent 2D display panels are emissive display panels, so that no expensive high-resolution projectors are required. Consequently, the size and price of the system 60 are greatly reduced compared with conventional volumetric 3D display systems. Furthermore, there is no need to turn on/off the optical plates, such as liquid crystal display (LCD), in synchronization with the projection of a projector, so that a control system is simpler than a control system in conventional 3D display systems. Compared with a conventional volumetric 3D display system using a motor to fast rotate a screen, the volumetric 3D display system according to an embodiment of the present invention does not have problems associated with noise or vibration caused by the motor.

As described above, thin, flexible, transparent 2D display panels are needed to form the volumetric 3D display system 60. Examples of widely used 2D display panels include liquid crystal panels (LCDs), organic light-emitting devices (OLEDs), plasma display panels (PDPs), etc. However, LCDs require a backlight because they are non-emissive displays. PDPs have difficulty in being thinned and consume much power. On the other hand, OLEDs have many advantages in that they consume only half the power consumed by LCDs despite being emissive displays, can be thinned to a thickness equal to or less than ⅓ of the thickness of an LCD, and have a wide viewing angle and a response speed of about 1000 times as fast as LCDs. Moreover, OLEDs have a simple structure and thus can be easily manufactured. Additionally, OLEDs can be bent or even folded by using a substrate formed of a transparent polymer material. Thus, OLEDs, among the widely used 2D display panels, are the most suitable to manufacture the volumetric 3D display panel 62.

Figure 1:
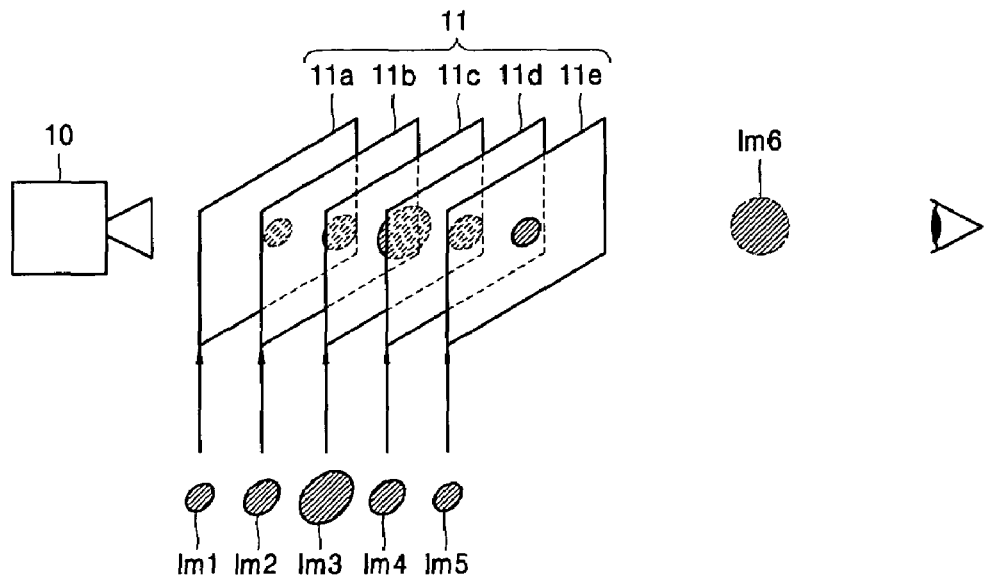
FIG. 1 schematically illustrates a conventional volumetric 3D display device.
Figure 2:
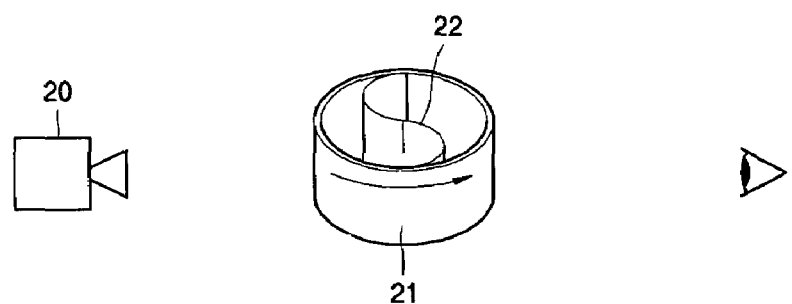
FIG. 2 schematically illustrates another conventional volumetric 3D display device.
Figure 3:
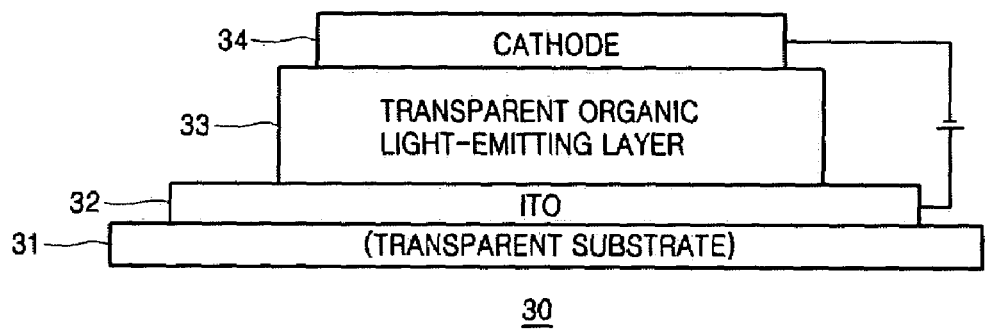
FIG. 3 is a cross-sectional view illustrating a structure of an organic electroluminescence (EL) display panel used in the present invention.

FIG. 3 is a schematic cross-sectional view of a structure of an OLED 30. As shown in FIG. 3, the OLED 30 generally includes a transparent substrate 31, a transparent electrode 32, such as, ITO, formed on the transparent substrate 31, a transparent organic light-emitting layer 33 formed on the transparent electrode 32, and a cathode 34 formed on the organic light-emitting layer 33. The transparent substrate 31 may be made of a polymer material, such as plastic. A polymer material is light and flexible. In particular, due to the recent use of a transparent nano fiber with a diameter of 100 nm or less as a reinforcing element, it is possible to manufacture a polymer substrate that is flexible and transparent enough to have a parallel ray transmittance of over 85% and has a low thermal expansion coefficient. The transparent electrode 32 is usually made of indium tin oxide (ITO). The organic light-emitting layer 33 is formed of a monomer material, such as $Alq_3$, Anthracene, etc., or a polymer material, such as, poly(p-phenylenevinylene) (PPV), polythiophene (PT), etc. To enhance light emission efficiency, an electron transporting layer (not shown) may be interposed between the cathode 34 and the organic light-emitting layer 33, and a hole transporting layer (not shown) may be interposed between the transparent electrode 32, which is an anode, and the organic light-emitting layer 33. The cathode 34 is usually formed of metal having a relatively low work function. Recently, a transparent organic light emitting device (TOLED) having a front side and a rear side through both of which viewers can view an image has been developed by forming the cathode 34 of a transparent material.

Figure 4:
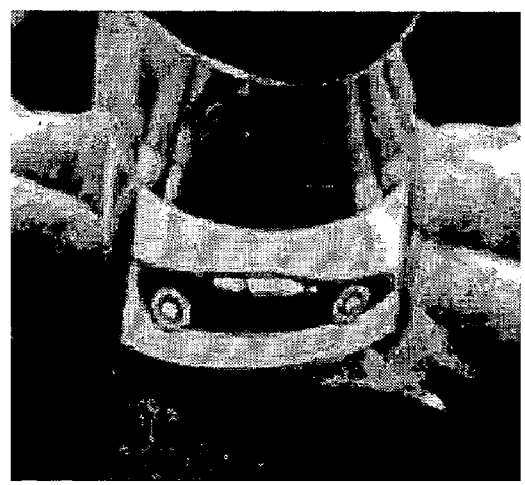
FIG. 4 is a picture of a transparent, flexible organic EL display panel.

FIG. 4 is a picture of such a TOLED. As shown in FIG. 4, the entire area of the TOLED except for a portion on which an image is displayed can be transparent by rendering electrodes on both sides of the organic light-emitting layer 33 transparent. Moreover, by forming the transparent substrate 31 of a polymer material, the TOLED can properly display an image even though being bent. Hence, such a flexible TOLED can be used to manufacture the volumetric 3D display panel 40.

Figure 5:
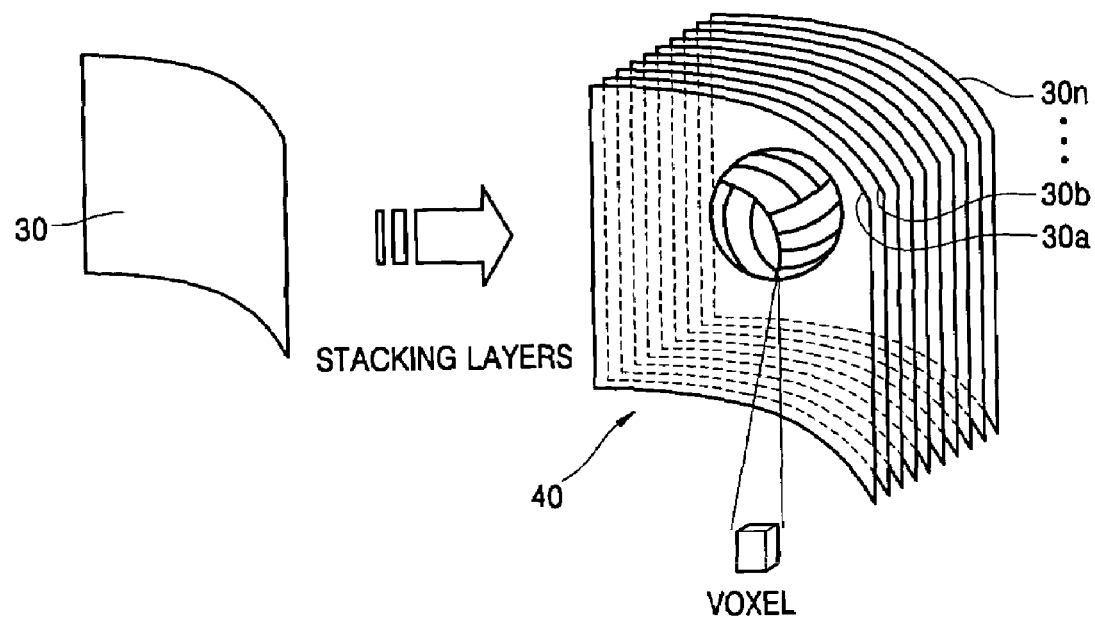
FIG. 5 schematically illustrates a volumetric 3D display panel according to an embodiment of the present invention.

FIG. 5 schematically illustrates the volumetric 3D display panel 40 formed by stacking a plurality of transparent display panels 30*a* through 30*n*, such as, the transparent OLED 30. As shown in FIG. 5, the volumetric 3D display panel 40 is formed by stacking the thin, transparent 2D flexible display panels 30 without gaps. In this case, to stably maintain junctions between adjacent 2D display panels 30, a substrate having a small thermal expansion coefficient is preferably used as a substrate included in each of the 2D display panels 30. In this structure, since the 2D display panels 30 are transparent, any of the images displayed on the 2D display panels 30 can be recognized by a viewer. Hence, the volumetric 3D display panel 40 can be considered as a 3D configuration of pixels. The pixels of the volumetric 3D display panel 40 can be referred to as voxels. In other words, if a picture element of a single flat display panel is called a pixel, a pixel having a thickness is referred to as a voxel. The volumetric 3D display panel 40 of FIG. 5 can provide a more perfect 3D image with an increase in the number of 2D display panels 30 stacked. Also, the volumetric 3D display panel 40 can provide a more precise 3D image with a decrease in the thickness of each of the 2D display panels 30. For example, it is preferable that the thickness of each of the flat display panels 41 is less than or equal to 2 mm.

Since the 2D display panels 30*a* through 30*n* are flexible, a display surface of the volumetric 3D display panel 40 may not only be flat but also have a predetermined curvature by stacking and bending the 2D display panels 30*a* through 30*n* as shown in FIG. 5. When the volumetric 3D display panel 40 has a bent display surface, a viewing angle is greatly enlarged.

FIGS. 6A through 8B illustrate various volumetric 3D display panels formed using the flexible display panels 30. FIG. 6A illustrates a cylindrical volumetric 3D display panel 50, which is formed by rolling and stacking a plurality of flat, transparent, rectangular 2D flexible display panels 30 in a circle. Images are displayed on the flat, transparent, rectangular 2D flexible display panels 30 to produce a 3D image. The cylindrical volumetric 3D display panel 50 has an advantage in that it can enlarge a viewing angle to even 360 degrees. In other words, viewers can enjoy a 3D image no matter where the viewers are located around the cylindrical volumetric 3D display panel 50. Hence, the cylindrical volumetric 3D display panel 50 is suitable to be used in places, such as, an exhibition hall, a show hall, etc.

Figure 6B:
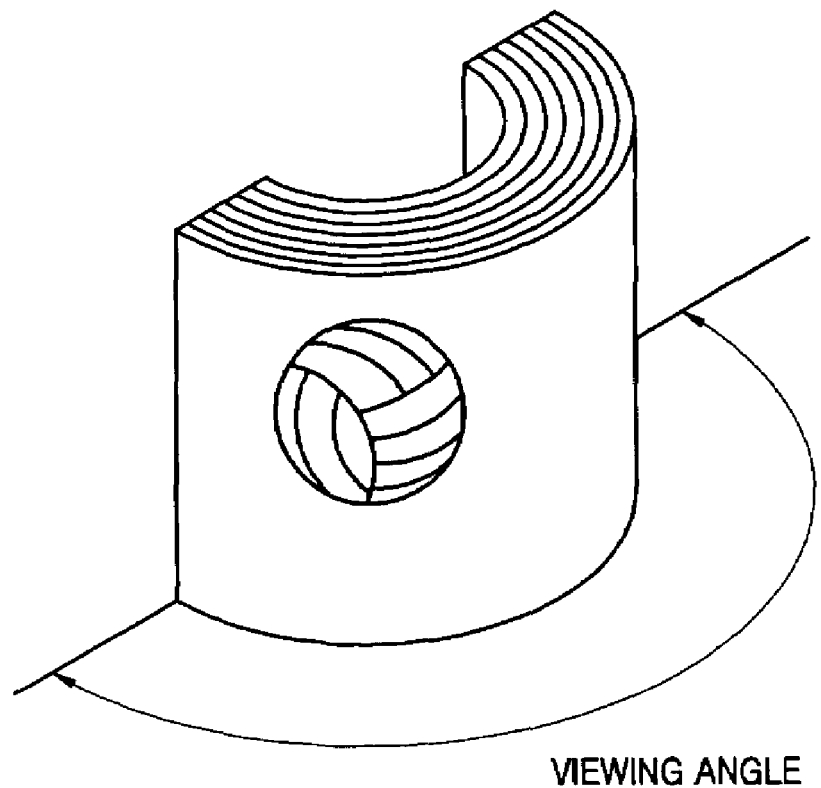
Figure 6C:
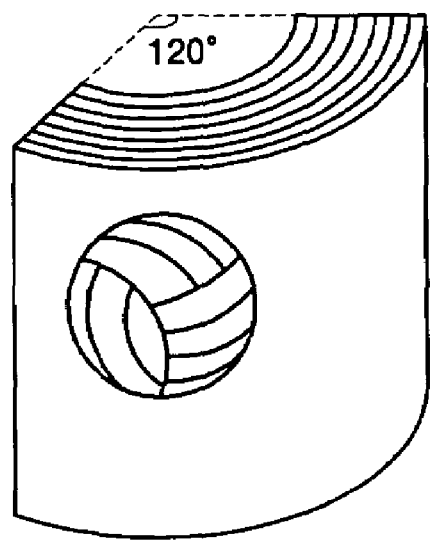

FIG. 6B illustrates a half-cylindrical volumetric 3D display panel formed by rolling and stacking a plurality of flat, transparent, rectangular 2D flexible display panels 30 in a semicircle. The half-cylindrical volumetric 3D display panel can enlarge a viewing angle to even 180 degrees. Hence, the half-cylindrical volumetric 3D display panel can be attached onto the wall, etc. FIG. 6C illustrates a volumetric 3D display panel having a fan-shaped cross-section by stacking and rolling a plurality of flat, transparent, rectangular 2D flexible display panels 30 fanwise. The volumetric 3D display panel having a fan-shaped cross-section may be installed at a corner where two wall surfaces meet. 3D display panels having various cross-sections, such as, a circle, a semicircle, and a sector, can be manufactured according to an angle by which 2D display panels are rolled.

Figure 7A:
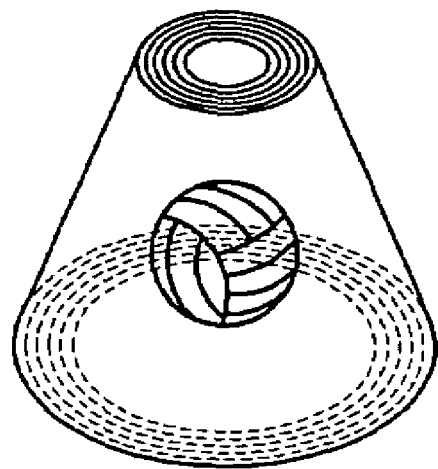
FIGS. 7A and 7B illustrate conical volumetric 3D display panels according to another embodiment of the present invention.
Figure 7B:
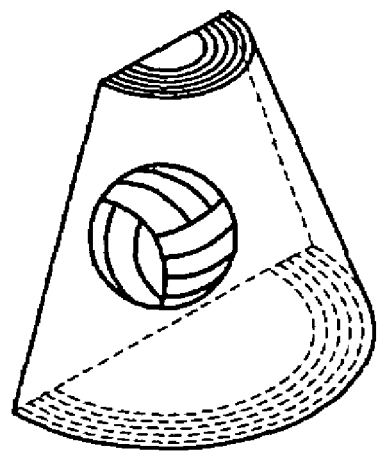
Figure 8A:
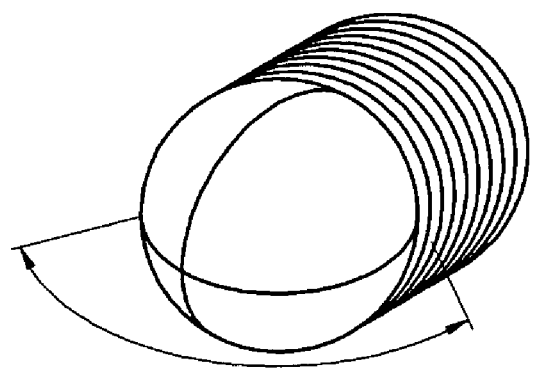
FIGS. 8A and 8B illustrate convex volumetric 3D display panels according to another embodiment of the present invention.
Figure 8B:
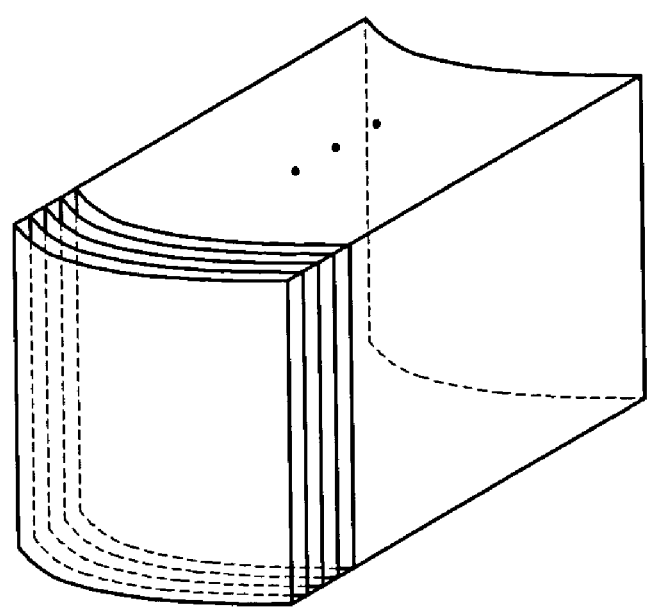

FIGS. 7A and 7B illustrate a conical 3D display panel and a half conical 3D display panel, respectively, formed by rolling and stacking flat, fan-shaped, flexible 2D display panels. FIGS. 8A and 8B illustrate a convex volumetric 3D display panel formed by stacking a plurality of convex circular flexible 2D display panels and a convex volumetric 3D display panel formed by stacking a plurality of convex rectangular flexible 2D display panels, respectively. The convex volumetric 3D display panels of FIGS. 8A and 8B have convex display surfaces.

As shown in FIGS. 6A through 8B, various shapes of 3D display panels can be manufactured because the transparent 2D display panels, such as, OLEDs, are flexible.

Although a volumetric 3D display system 60 shown in FIG. 9 uses the cylindrical volumetric 3D display panel 50 of FIG. 6A as a volumetric 3D display panel 62, the volumetric 3D display panels of FIGS. 6B through 8B may be used. Alternatively, the volumetric 3D display system 60 may use a volumetric 3D display panel having a flat display surface other than the volumetric 3D display panels shown in FIGS. 6A through 8B.

Figure 10:
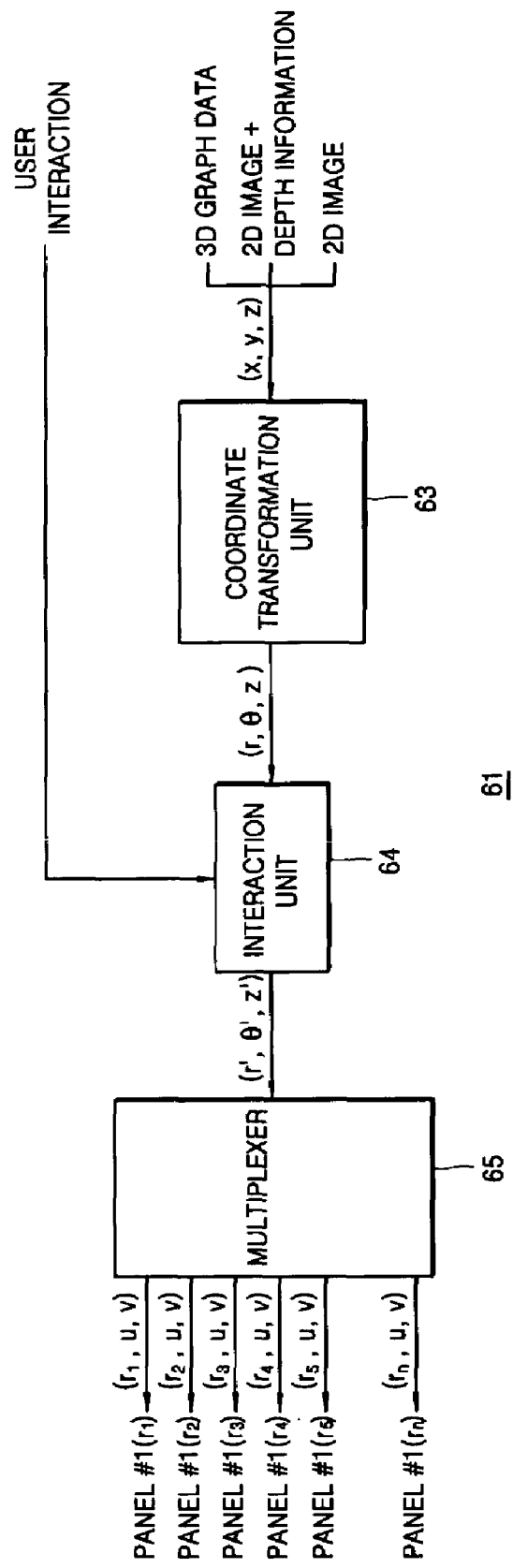
FIG. 10 is a block diagram of a structure of a control unit of the volumetric 3D display system of FIG. 9.

Since the volumetric 3D display system 60 produces a stereoscopic effect by overlapping a plurality of 2D images with one another, the volumetric 3D display system 60 needs a control unit 61 to adequately distribute the 2D images to the 2D display panels of the volumetric 3D display panel 62. FIG. 10 is a block diagram of a structure of the control unit 61 of the volumetric 3D display system 60.

As shown in FIG. 10, the control unit 61 includes a coordinate transformation unit 63 for producing a coordinate for an image to be displayed on the volumetric 3D display panel 62, an interaction unit 64 for processing the image in various forms according to a user's command, and a multiplexer 65 for distributing image data to the 2D display panels of the volumetric 3D display panel 62.

Examples of formats of image data that can be generally input to the volumetric 3D display panel 60 include 3D graphic data, a combination of a 2D image and depth information, pure 2D image data, a composition of graphics and a real picture, etc. The coordinate transformation unit 63 receives image data having these formats and transforms a coordinate of the image data so that the image data can be efficiently displayed by the volumetric 3D display system 60. Generally, a 3D image has a coordinate, such as, a Cartesian coordinate, a cylindrical coordinate, a spherical coordinate, etc. For example, when the cylindrical or half-cylindrical 3D display panel of FIG. 6A, 6B, or 6C is used, coordinates of an input 3D image are transformed into cylindrical coordinates. In other words, the coordinate transformation unit 63 transforms a received 3D image (x, y, z) with Cartesian coordinates into an image (r, θ, z) having a depth value (which is expressed in an r-coordinate), an azimuth angle (which is expressed in a θ-coordinate), and a height (which is expressed in a z-coordinate).

The coordinate-transformed image is distributed to the 2D display panels of the volumetric 3D display panel 62 via the multiplexer 65. More specifically, the multiplexer 65 converts the depth value of the coordinate-transformed image into physical depth values in which the number of flat display panels is reflected, and provides 2D images to the corresponding 2D display panels according to the physical depth values. If the volumetric 3D display panel 62 is the cylindrical or half-cylindrical volumetric 3D display panel of FIG. 6A, 6B, or 6C, and n 2D display panels, namely, first through n-th 2D display panels, are used, the multiplexer 65 distributes to the first through n-th flat display panels identical values for the θ-coordinate and identical values for the z-coordinate together with different values for the r-coordinate of the image obtained by the coordinate transformation unit 63. Then, the first through n-th panels display 2D images each having a θ-coordinate and a z-coordinate. A user recognizes the overlapped 2D images as a single 3D image.

Interaction capable of varying an image by performing an action, such as, rotation, translation, or zooming in/out, is very important for 3D display. Hence, as shown in FIG. 10, the control unit 61 further includes the interaction unit 64 to rotate, translate, or zoom in/out the image output from the coordinate transformation unit 63 according to a user's command. Image data (r', θ', z') obtained by the rotation, translation, or zoom in/out by the interaction unit 64 is processed by the multiplexer 65, and resultant 2D images output by the multiplexer 65 are distributed to and displayed on the 2D display panels of the volumetric 3D display panel 62.

As described above, in a volumetric 3D display system according to the present invention, a plurality of transparent 2D display panels are self-illuminated to display images, so that an expensive high-resolution projector is not needed. Thus, the entire size of the system can be greatly reduced, and the price thereof can also be greatly reduced. Additionally, there is no need to execute an action necessary in a conventional display system, that is, synchronization of an on/off operation of the optical plates, such as LCD panels, with projection of images by a projector, so that a control system of the system is simplified. In particular, when OLEDs are used as the transparent 2D display panels, a response speed is very high. Thus, the volumetric 3D display system according to the present invention can more efficiently display a 3D image than a conventional display system using a projector. Furthermore, the volumetric 3D display system according to the present invention does not generate noise or vibration caused by a motor when compared with a conventional display system employing a method of rotating a screen at high speed.

Moreover, since OLEDs are flexible, 3D display panels having various curved surfaces may be formed to be used in various places where display panels are to be installed, and 3D display panels having wide viewing angles can be obtained.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A volumetric three-dimensional display system comprising:
   a volumetric three-dimensional display panel comprising a stack of a plurality of transparent two-dimensional flexible display panels,
   wherein the plurality of transparent two-dimensional flexible display panels are stacked without gaps; and
   a control unit which distributes a plurality of two dimensional images having depth information produced from an input image to the transparent two-dimensional display panels according to the depth information,
   wherein the two-dimensional images are displayed on the transparent two-dimensional display panels to form a single three-dimensional image, and a display surface of the volumetric three-dimensional display panel is curved with a predetermined curvature;
   an interaction unit which receives a command from a user to rotate, translate, or zoom in/out the three-dimensional image.

2. The volumetric three-dimensional display system of claim 1, wherein the input image is 3D graph data or 2D image data.

3. The volumetric three-dimensional display system of claim 1, wherein the volumetric three-dimensional display panel has a cylindrical shape, the cylindrical shape being achieved by stacking and rolling a plurality of flat, rectangular two-dimensional flexible display panels in a circle.

4. The volumetric three-dimensional display system of claim 1, wherein the volumetric three-dimensional display panel has a half cylindrical shape, the half cylindrical shape being achieved by stacking and rolling a plurality of flat, rectangular two-dimensional flexible display panels in a semicircle.

5. The volumetric three-dimensional display system of claim 1, wherein the volumetric three-dimensional display panel has a fan-shaped cross-section, the fan-shaped section being achieved by stacking and rolling a plurality of flat, rectangular two-dimensional flexible display panels fanwise.

6. The volumetric three-dimensional display system of claim 1, wherein the volumetric three-dimensional display panel has a conical shape, the conical shape being achieved by stacking and rolling a plurality of flat fan-shaped two-dimensional flexible display panels.

7. The volumetric three-dimensional display system of claim 1, wherein the volumetric three-dimensional display panel has a convex display surface.

8. The volumetric three-dimensional display system of claim 1, wherein the transparent two-dimensional display panels are organic light-emitting devices.

9. The volumetric three-dimensional display system of claim 7, wherein each of the transparent two-dimensional display panels comprises:
   a transparent substrate;
   a first transparent electrode formed on the transparent substrate;
   an organic light-emitting layer formed on the first transparent electrode; and
   a second transparent electrode formed on the organic light-emitting layer.

10. The volumetric three-dimensional display system of claim 1, wherein the control unit comprises:
   a coordinate transformation unit transforming a coordinate of an input three-dimensional image into a coordinate of the volumetric three-dimensional display panel; and
   a multiplexer dividing the coordinate-transformed 3D image into a plurality of two-dimensional images having depth information and distributing the plurality of two-dimensional images to the transparent flat display panels according to the depth information.

* * * * *